Patented Apr. 1, 1924.

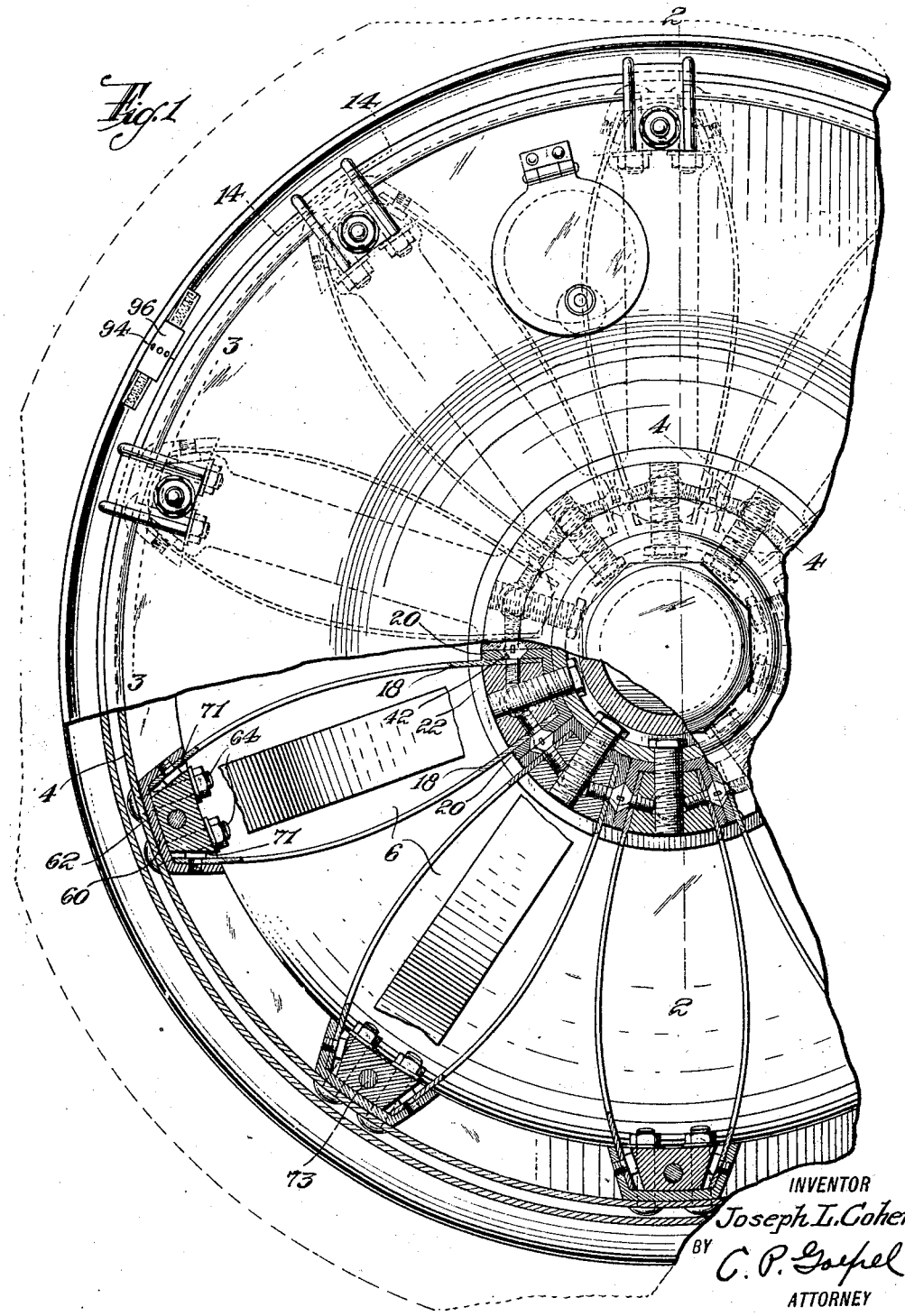

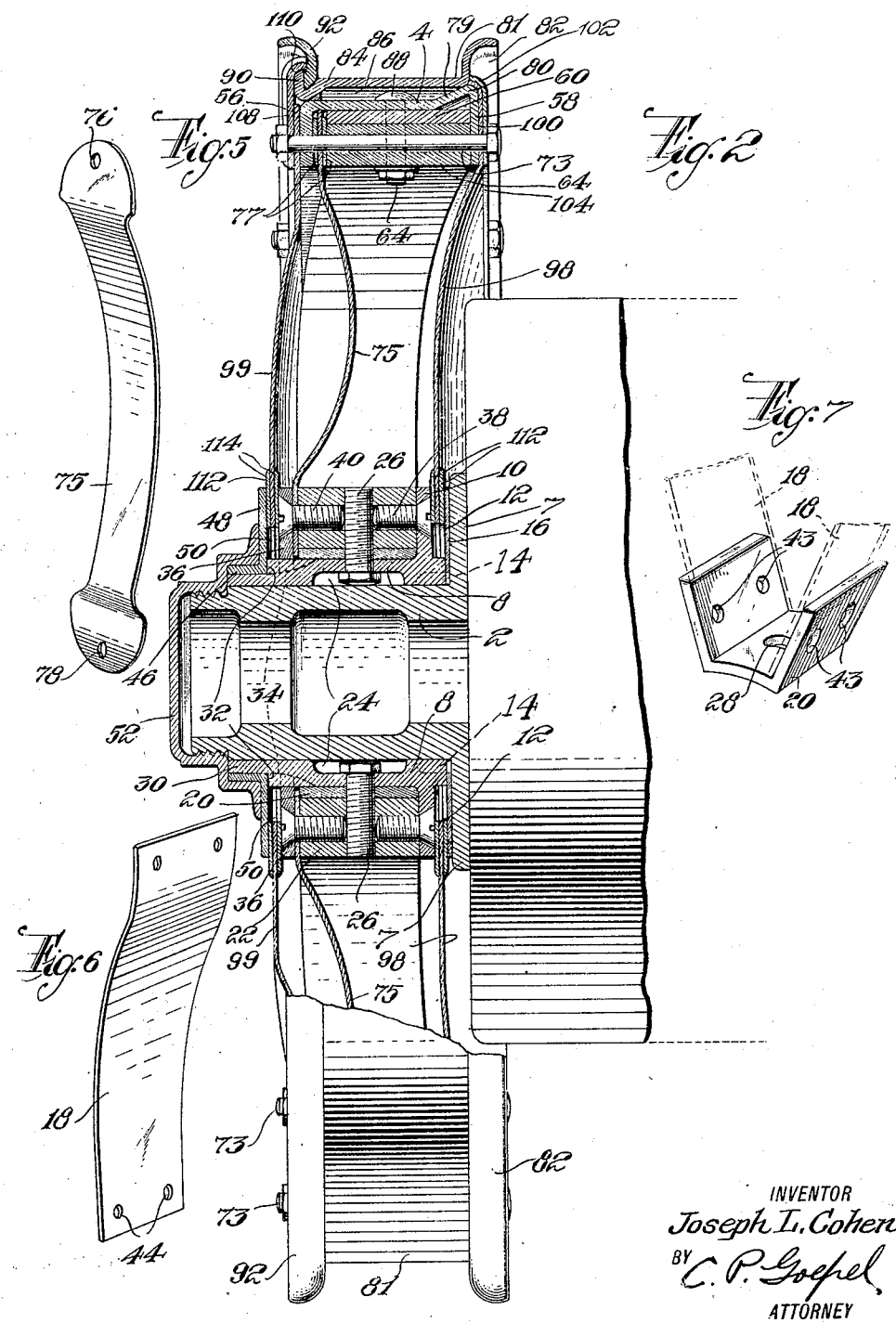

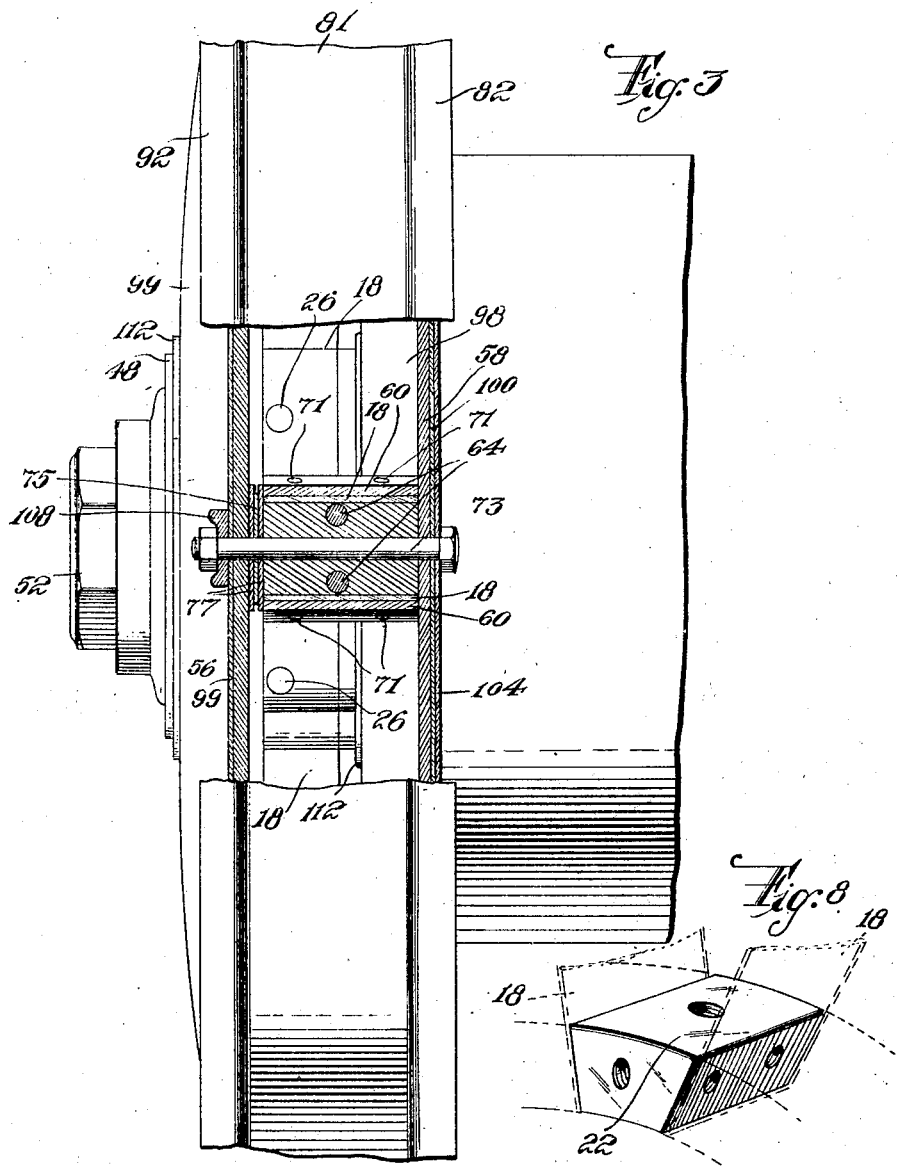

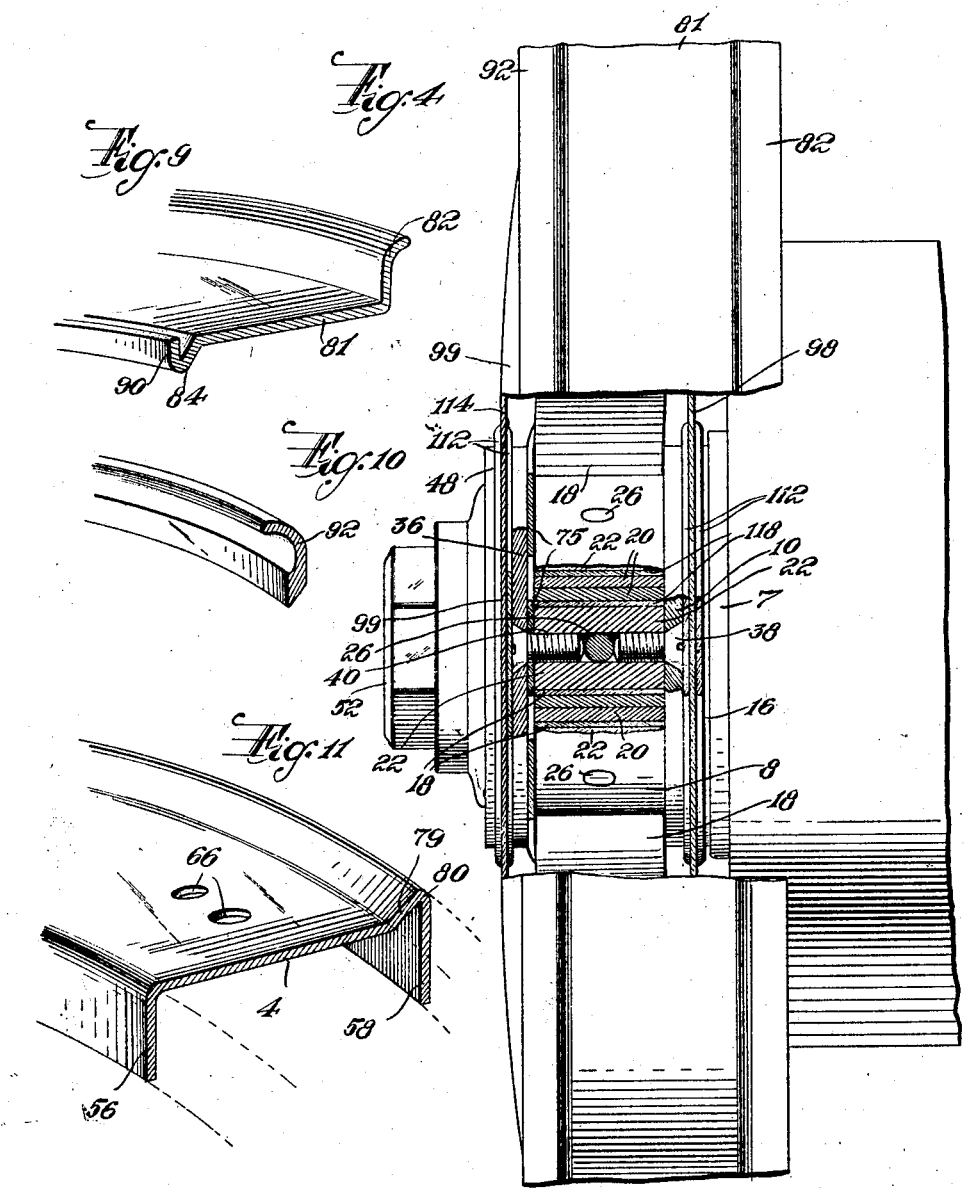

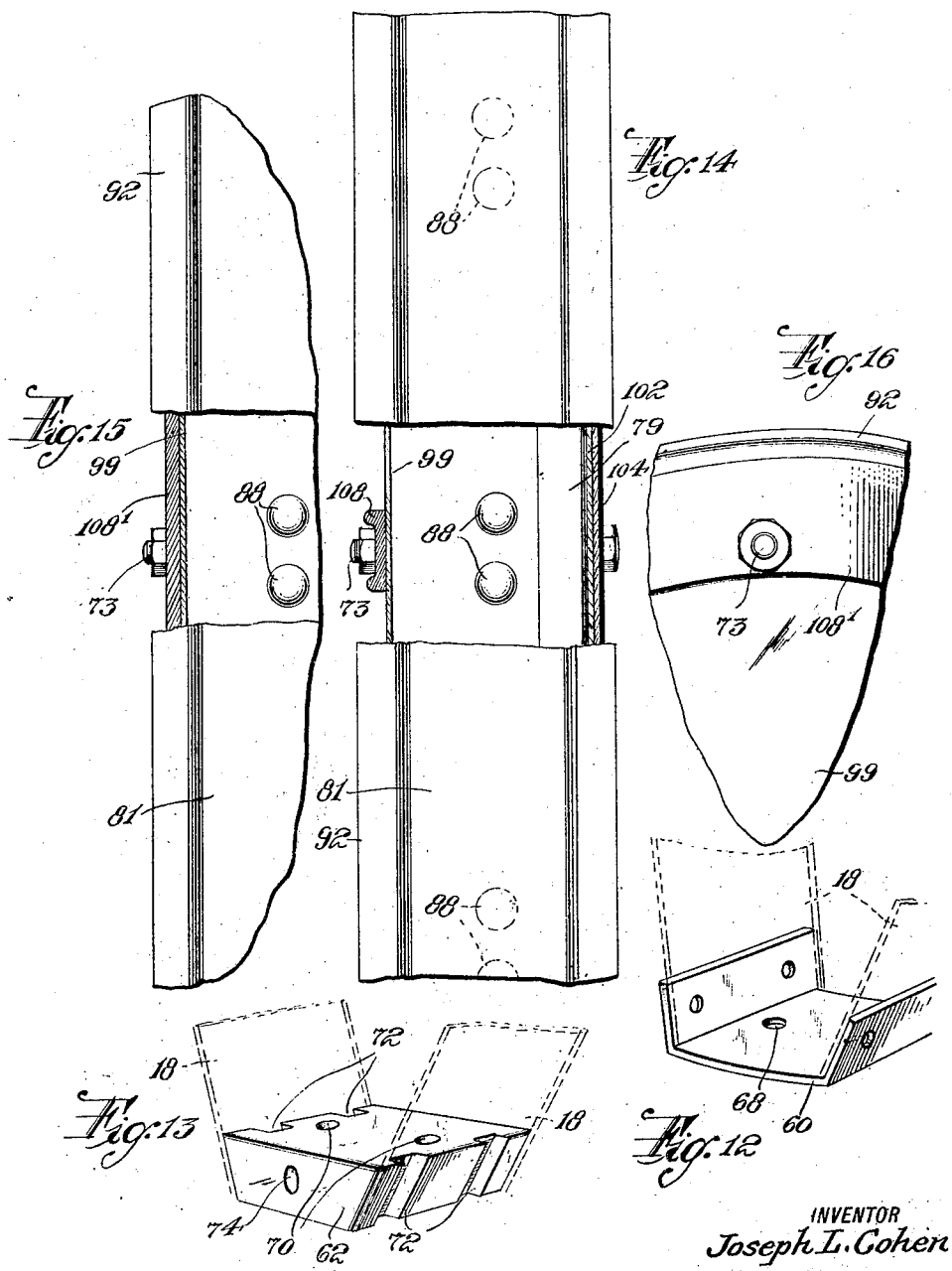

1,488,778

UNITED STATES PATENT OFFICE.

JOSEPH L. COHEN, OF NEW YORK, N. Y.

VEHICLE WHEEL.

Application filed March 28, 1922. Serial No. 547,562.

*To all whom it may concern:*

Be it known that I, JOSEPH L. COHEN, a citizen of the United States, and a resident of the city, county, and State of New York, have invented certain new and useful Improvements in Vehicle Wheels, of which the following is a specification.

This invention relates to vehicle wheels and particularly to wheels designed for use on motor vehicles.

It is an object of the invention to improve wheels of the type comprising sets of resilient spoke elements in various respects, including the provision of discs covering the space between the felly and the hub so as to conceal the spoke elements from view and simple and effective means for securing the inner and outer ends of the elements to the hub and felly respectively.

To this end an important feature of the invention resides in the provision of discs carried by the felly on the front and rear sides of the wheel and movable with the felly eccentrically of the hub upon yielding of the resilient spoke elements. The invention, however, contemplates the provision of a single disc only, located either on the front or rear side of the wheel, as may be desired.

A further feature of the invention resides in the provision of a flange at the rear end of the hub, and means for securing the inner ends of the spoke elements to a sleeve fitted on the hub and provided at its rear end with a flange spaced from the flange of the hub to provide a space between them in which the inner edge of the disc at the rear side of the wheel is received.

In accordance with a still further feature of the invention, a ring is mounted on the sleeve forwardly of the means for connecting the inner ends of the spoke elements thereto, and the sleeve is provided with a shoulder against which abuts a second ring in spaced relation to the first to provide a groove for receiving the inner edge of the disc on the front side of the wheel.

Still other objects and features of the invention will appear as the description proceeds and will be pointed out in the appended claims.

In the drawings in which like reference numerals designate like parts in the various views:

Figure 1 is a view in front elevation, partly broken away, of a wheel constructed in accordance with the invention;

Fig. 2 is an edgewise view partly in section along the line 2—2 of Fig. 1;

Fig. 3 is an edgewise view partly broken away substantially along the line 3—3 of Figure 1;

Fig. 4 is a view also looking edgewise of the wheel and partly broken away substantially along the line 4—4 of Fig. 1;

Fig. 5 is a detail view of one of the spoke elements arranged on the front side of the wheel;

Fig. 6 illustrates another of the resilient spoke elements;

Fig. 7 is a detail view of one of the yokes which connect the inner ends of the spoke elements to the hub;

Fig. 8 is a detail view of the block which secures the ends of the spoke elements in the yoke;

Fig. 9 is a view partly in perspective and partly in transverse section of the main section of the wheel rim;

Fig. 10 is a like view of the demountable section of the rim;

Fig. 11 is a like view of the felly;

Fig. 12 is a detail view of the yokes connecting the outer ends of the spoke elements to the felly;

Fig. 13 is a detail view of the block whereby the spoke elements are secured in the yoke;

Fig. 14 is a view of the form of the invention shown in Fig. 1, partly broken away substantially along the line 14—14 of said figure;

Fig. 15 is a view corresponding with the left hand side of Fig. 14 but showing a modified form of the invention;

Fig. 16 is another view of such modified form of the invention looking from the right in Fig. 15.

The illustrated construction comprises a hub 2 and a felly 4 connected by sets 6 of resilient spoke elements. The hub 2 is formed at its rear end with a flange 7, and mounted on the hub 2 forwardly of the flange 7 is a sleeve 8 formed at its rear end with a flange 10 spaced from the flange 7 of the hub 2 to provide a groove 12. The sleeve 8 is connected to the hub 2 for rotation therewith by keys 14 on the hub fitting into correspondingly shaped channels in the inner surface of the rear end of the sleeve. Preferably, and as shown, a washer 16 is interposed between the rear end of the sleeve 8 and the forward surface of the hub flange 7.

Each of the sets 6 of resilient spoke elements comprises a pair of oppositely curved metal strips 18 arranged with their transverse sections extending substantially at right angles to the plane of the wheel and being connected at their inner ends to the sleeve 8 by yokes 20 and blocks 22. The yokes 20 are substantially U-shaped in sections transverse to the hub 2 and the sleeve 8, but have their sides extending outwardly from their base portions at an angle somewhat greater than a right angle. The yokes 20 are grouped around the periphery of the sleeve 8 with the sides of each of the yokes in contact with the adjacent sides of the contiguous yokes, and the base portions of the yokes are curved in sections transverse to the hub to conform with the peripheral curvature of the sleeve 8. With this construction, the yokes 20 are caused to sustain each other against movement angularly on the sleeve 7 and are caused to fit closely against the periphery of the sleeve, as well as against each other.

The sleeve 8 is formed on its inner surface with an annular groove 24 which receives the heads of screw bolts 26 passing through the sleeve 8 and through openings 28 in the base portions of the yokes 20 and threaded into the blocks 22. The sleeve 8 is formed at its front end with a reduced portion 30 which terminates in a shoulder 32, and the outer face of the sleeve is provided with notches 34 extending rearwardly from said shoulder. A ring 36 is fitted over the sleeve 8 forwardly of the yokes 20 and is provided with inwardly extending key-portions corresponding in shape to the notches 34 and received therein to cause the ring 36 to rotate with the sleeve 8 and the hub 2. The blocks 22 are secured in place not only by the screw bolts 26, but also by screws 38 and 40 mounted in the flange 10 of the sleeve 8 and the ring 36 respectively and threaded into the ends of the blocks, and the resilient strips 18 of each set of spoke elements are connected at their inner ends to the sides of the yoke 20 and the block 22 by screws 42 passing through the sides of the yoke and openings 44 adjacent to the inner ends of the strips and threaded into the block 22. The heads of the screws 42 are countersunk below the outer surfaces of the sides of the yokes 20 in order to enable the sides of the yoke to closely engage each other as hereinbefore described.

Fitted upon the reduced portion 30 of the sleeve 8 is the base flange 46 of a ring 48 spaced from the ring 36 to provide a groove 50 between them. The ring 48 is mounted in place on the hub 2 by a hub cap 52 threaded on the front end of the hub. The purpose of the groove 50, as well as of the groove 12, will fully appear hereinafter.

The felly 4 of the wheel is substantially U-shaped in transverse section and comprises a peripheral portion and inwardly extending front and rear flanges 56 and 58 respectively. The outer ends of the strips 18 of each of the sets 6 of resilient spoke elements are connected to a yoke 60. The yokes 60 are similar to the yokes 20 at the inner ends of the spoke elements except that the outer surfaces of their base portions, instead of being concave, are convex to conform with the inner surface of the felly 4. A block 62 which, like the blocks 22, hereinbefore described, may be composed of wood or other suitable material, is inserted into each of the yokes 60 and the outer ends of the strip elements 18 are interposed between the inner surfaces of the sides of the yoke and the sides of the block. Bolts 64 passing through openings 66, 68' and 70 in the felly, yoke and block 62 respectively, secure the yoke and block to the felly and maintain the block 62 with its sides pressed against the outer ends of the strips 18. The strips 18 at their outer ends are secured to the yokes 60 not only by pressure of the blocks 62 upon them, but also by screws 71, the heads of which are received in channels 72 formed in the sides of the blocks 62, and the yoke 60 and block 62 of each set of spoke elements are further maintained against displacement relatively to the felly 4 by a bolt 73 passing through the flanges 56 and 58 of the felly and openings 74 in the block. With this construction, it will be manifest that the outer ends of the strip elements 18 are positively fixed to the felly 4 in a manner such as to enable them to sustain all strains to which they may be subjected in the use of the wheel.

Each of the sets 6 of spoke elements comprises, in addition to a pair of spoke elements 18, a third spoke element 75 in the form of a resilient metal strip located at the front side of the wheel and having its transverse sections arranged substantially in the plane of the wheel. The strip 75 of each set of spoke elements is received at its outer end between the front ends of the yoke 60 and block 62, on the one hand, and the inner surface of the front flange 56 of the felly 4 on the other. Preferably, and as shown, washers 77 are also arranged on each side of the outer end of the strip 75, and the washers and the strip are provided with openings 76 arranged to receive the bolt 73. At its inner end the strip 75 is provided with an opening 78 to receive the screw 40 and is fitted between the front ends of the yoke 20 and the block 22, on the one hand, and the ring 36 on the other. The spoke element 75 is curved rearwardly intermediate of its ends so that the main body of the strip is disposed between the strips 18.

The peripheral portion of the felly 4 is formed with an outwardly inclined portion 79, and the rear flange 58 of the felly is extended outwardly to a greater extent than the front flange 56 to connect with the outwardly inclined portion 79, thereby forming a bead 80 on the rear side of the felly 4. The main section 81 of the rim of the wheel is formed at its rear edge with an outwardly extending flange 82 which is concaved on its rear surface, as clearly shown in Fig. 2, and said section is formed at its front edge with an inwardly extending bead 84. The bead 84 and rear edge of the main section 81 of the rim are arranged to engage the outer surface of the felly 4 adjacent to the base of the front flange 56 and the apex of the bead 80 respectively, and the degree of inward extension of the bead 84 from the main body of the rim is substantially equal to the extent of outward projection of the bead 80 from the felly 4, so that the main body of the section 81 is disposed parallel to the main body of the peripheral portion of the felly. This construction enables the rim of the wheel to be firmly supported on the felly, and at the same time provides an annular space 86 between such parts for receiving the heads 88 of the bolts 64 by which the yokes 60 and blocks 62 are secured to the felly. The section 81 of the rim is formed on its front edge with a vertically disposed rib forming part of the bead 84, and the upper surface of the bead is substantially V-shaped to receive the correspondingly shaped inner edge of the demountable section 92 of the rim. In order to enable the section 92 to be readily disengaged from the main section 81, it is split as indicated at 94 (Fig. 1), and a right and left screw 96 is threaded in the ends of the section 92. This construction enables the section 92 to be readily expanded radially whereupon it can be easily removed from the wheel.

Secured to the rear side of the wheel and covering the space between the hub 2 and the felly 4, is a guard 98 in the form of a dish-shaped disc, the rear face of which is concave. The disc 98 has its outer rim portion 100 engaged against the outer surface of the flange 58 of the felly 4, and the outer edge portion 102 of the disc is curved to conform with the outer surface of the bead 80 of the felly. The edge face of the disc 98 is extended inwardly from the outer surface of the flange 58 of the felly and is constructed to abut closely against the rear edge of the main section 81 of the rim of the wheel at the base of the rearwardly extending flange 82. Located on the outer side of the rim portion 100 of the disc 98 is an annular ring 104, the outer edge portion of which is shaped conformably with the outer edge portion 102 of the disc. The edge face of the ring 104 abuts against the base of the flange 82 of the rim of the wheel outwardly of the edge face of the disc. The ring 104 and the rim portion 100 of the disc 98 are formed with openings aligning with the openings of the flanges 56 and 58 of the felly 4, and in the assembled wheel the disc 98 and ring 104 are rigidly secured to the felly between the heads of the bolts 73 and its outer flange 58.

The disc guard 99 at the front side of the wheel is also dish-shaped and is extended forwardly from its substantially plane edge portion away from the spoke elements of the wheel so as to present a convex surface on its front side. The outer edge portion of the front guard 99 engages against the outer surface of the front flange 56 on the felly 4 and the outer edge of the disc 99 is arranged substantially in alignment with the peripheral portion of the felly. The bolts 73 pass through aligned openings in the discs 99 and also through the base portions of cleats 108, the outer ends of which are curved as shown at 110 so as to fit closely against both the front and outer surfaces of the vertical rib on the main section 81 of the wheel rim and against the front surface of the demountable section 92 of the rim. It will be manifest that with this construction, the guards 98 and 99 are not only secured rigidly in position on the felly 4 but that the rim of the wheel is also positively secured against accidental displacement on the felly. The inner edges of the discs 98 and 99 are received in the grooves 12 and 50 respectively of the hub assembly and are reinforced by rings 112, the combined thickness of the discs and the rings on their inner edges being slightly less than the dimension axially of the hub 2 of the grooves 12 and 50 respectively, so as to enable the discs to move freely in the grooves. At the same time, however, the reinforced inner edge portions of the discs are arranged in sufficiently close engagement with the walls of the grooves to prevent the entrance of dirt into them. The reinforcing rings 112 on the discs 98 and 99 are preferably rounded at their outer edges as shown at 114 to impart an attractive appearance to the wheel.

It will be understood from the foregoing that the discs 98 and 99 effectively prevent fouling of the spoke elements or of their connections to the felly 4 and hub 2 by dirt, and that the guards may move freely with the felly 4 eccentrically of the hub so as to present no obstruction whatever to the action of the resilient spoke elements in absorbing the shocks to which the wheel is subjected.

In the form of the invention shown in Figs. 15 and 16, an annular ring 108' is employed in place of the cleats 108 for maintaining the rim of the wheel against displacement on the felly. The ring 108' is constructed in transverse section analogously to the cleats 108 and serves in the same effective manner to maintain the parts in their properly assembled relations.

Having fully described the invention what is claimed is:

1. In a vehicle wheel, a hub, a felly, a plurality of sets of resilient spoke elements extending radially between the hub and felly and each comprising a pair of resilient elements extending radially between the hub and felly in the plane of the wheel, and a third resilient spoke element disposed radially of the wheel at one side thereof and bowed inwardly between said first named spoke elements.

2. In a vehicle wheel, a hub, a felly, a plurality of sets of resilient spoke elements connecting the hub to the felly and each comprising a pair of oppositely related resilient elements extending radially of the wheel and fixed at their ends to the hub and felly respectively, and a third resilient spoke element arranged at one side of the wheel and fixed at its ends to the hub and felly thereof and bowed inwardly between said first named spoke elements.

3. In a vehicle wheel, a hub, a felly, a plurality of resilient spoke elements extending radially between the hub and felly, said felly being of channel form in cross-section, radially movable sheet metal discs at the inner and outer sides of the wheel enclosing said sets of spoke elements, and means for confining the outer ends of the spoke elements in the channel of said felly, said means including spacing blocks disposed between the ends of the spoke elements in each set, and a common means for rigidly fixing said spacing blocks and the sheet metal discs to said felly.

4. In a vehicle wheel, a hub, a felly, a plurality of resilient spoke elements extending radially between the hub and felly, said felly being of channel form in cross-section, radially movable sheet metal discs at the inner and outer sides of the wheel enclosing said sets of spoke elements, and means for confining the outer ends of the spoke elements in the channel of said felly, said means including spacing blocks disposed between the ends of the spoke elements in each set, means for rigidly securing each of said spacing blocks to the wheel felly, and additional bolts extending transversely through said spacing blocks and securing the sheet metal discs to the opposite sides of the wheel felly.

5. In a vehicle wheel, a hub, a felly, a plurality of sets of resilient spoke elements connecting the hub to the felly, each of said sets comprising a pair of resilient elements arranged in oppositely curved relation and a third element in the form of a resilient strip disposed at the outer side of the first-mentioned elements and extending therebetween radially of the wheel and a disc covering the space between the hub and the felly on such side of the wheel.

6. In a vehicle wheel, a hub, a felly, a plurality of sets of resilient spoke elements connecting the hub to the felly, each of said sets comprising a pair of resilient strips extending from the hub to the felly in oppositely curved relation and means for securing said strips to the hub and felly, comprising yokes carried by said last-mentioned parts and with which the ends of said strips are engaged, and blocks insertable into the yokes upon the end portions of the strips.

7. In a vehicle wheel, a hub, a felly, a plurality of sets of resilient spoke elements connected at one of their ends to the felly and means for securing the other ends of the spoke elements to the hub, comprising a sleeve constructed to fit over the hub and having a flange at its rear end, yokes mounted on the sleeve forwardly of said flange adapted to receive the inner ends of the spoke elements, blocks insertable into the yokes, a ring fitted upon the sleeve forwardly of the yokes and means for securing the yokes, spoke elements and blocks in position, comprising screws mounted in said flange and said ring and threaded into the blocks.

8. In a vehicle wheel, a hub, a felly, a plurality of sets of resilient spoke elements connected at one of their ends to the felly and means for securing the other ends of the spoke elements to the hub, comprising a sleeve on the hub formed with an annular groove in its inner surface and having a flange at its rear end, means for securing the sleeve to the hub for rotation therewith, substantially U-shaped yokes arranged around the sleeve forwardly of the flange, each of said yokes having its sides in substantial contact with the sides of adjacent yokes, blocks insertable into the yokes, a ring fitted upon the sleeve forwardly of the yokes, means for securing the spoke elements to the yokes and blocks comprising screws mounted in the sides of the yokes and having their heads countersunk below their outer surfaces, and means for securing each of the yokes and blocks to the sleeve comprising screws mounted in said flange and said ring and threaded into the ends of the blocks and a screw having its head contained in the groove of said sleeve and extending through the base of the yoke into the blocks.

9. In a vehicle wheel, a hub having a flange at its rear end, a felly, a plurality of sets of resilient spoke elements connected at one of their ends to the felly, a sleeve on the hub provided with a forwardly facing shoulder, means for securing the other ends of the spoke elements to said sleeve, a ring located on the sleeve forwardly of said means, said securing means including a part retaining said ring in fixed relation to the sleeve, a second ring mounted on the sleeve in engagement with said shoulder and spaced from the first-mentioned ring to provide a groove between them, and a disc secured to the felly at the front side of the wheel and having its inner edge extending into said groove.

In testimony that I claim the foregoing as my invention, I have signed my name hereunder.

JOSEPH L. COHEN.